United States Patent [19]
Groff

[11] 3,904,813
[45] Sept. 9, 1975

[54] ADHESIVE FOR METAL-CLAD SHEETING

[75] Inventor: Gaylord L. Groff, North St. Paul, Minn.

[73] Assignee: Minnesota Mining and Manufacturing Company, St. Paul, Minn.

[22] Filed: Mar. 18, 1974

[21] Appl. No.: 451,921

[52] U.S. Cl. ........ 174/68.5; 156/330; 260/830 TW; 260/835; 317/101 F; 428/416; 428/474; 428/901; 428/906

[51] Int. Cl.$^2$ ...................... B32B 27/38; H05K 1/00

[58] Field of Search ..... 260/830 TW, 835; 161/184, 161/186, 214, 227, DIG. 7; 156/330; 174/68.5; 317/101 F

[56] References Cited

UNITED STATES PATENTS

| | | | |
|---|---|---|---|
| 2,969,300 | 1/1961 | Franz | 161/DIG. 7 |
| 3,177,090 | 4/1965 | Bayes et al. | 117/123 D X |
| 3,179,614 | 4/1965 | Edwards | 260/30.2 |
| 3,320,202 | 5/1967 | Bolton | 260/30.2 |
| 3,424,707 | 1/1969 | Schaufelberger | 260/830 TW X |
| 3,536,546 | 10/1970 | Nielsen et al. | 161/186 X |
| 3,576,903 | 4/1971 | Groff | 117/135.1 X |
| 3,717,543 | 2/1973 | Sinclair et al. | 161/227 X |

*Primary Examiner*—Harold Ansher
*Assistant Examiner*—Henry F. Epstein
*Attorney, Agent, or Firm*—Alexander, Sell, Steldt & DeLaHunt

[57] ABSTRACT

An adhesive composition is disclosed that comprises a mixture of (a) an epoxy-terminated polymer formed by reacting an epoxy compound with a carboxyl-terminated polymer, (b) a polyhydroxy ether formed from bisphenol A and epichlorohydrin, and (c) an epoxy-reactive curing agent. The adhesive is especially useful to adhere an electrically conductive metal to an electrically insulating base sheet to form a multilayered sheeting useful as a component of electric circuitry.

15 Claims, No Drawings

ADHESIVE FOR METAL-CLAD SHEETING

BACKGROUND OF THE INVENTION

Multilayered or composite sheeting comprising an electrically insulating polymeric base sheet, a layer of electrically conductive metal, and a layer of adhesive bonding the layer of metal to the base sheet is especially useful in the manufacture of flexible electrical circuitry. There are special requirements for the layer of adhesive in this sheeting that make it difficult to find satisfactory adhesive materials:

1. The adhesive must effectively bond the layer of metal to the base sheet throughout a variety of operations that are performed on the sheeting, including handling, slitting, and punching of the sheeting; etching of unwanted areas from the metal layer; soldering operations which involve the use of high temperatures, such as 450°–500° F, and plating operations. The achievement of a good bond is complicated by the fact that, in one important form, the electrically insulated base sheet comprises polyimide, and it is difficult to find adhesive materials that adhere well to polyimides.

2. The adhesive must develop adhesion at a low temperature, preferably less than about 350° F, to achieve good dimensional stability in the sheeting. Generally the sheeting is formed by laminating the layer of metal to a preformed base sheet on which the layer of adhesive has previously been coated, using heat to soften the layer of adhesive and pressure to press the sheets together. Stresses are incorporated into the sheeting during the laminating operation as a result of a difference between the base sheet and the layer of metal as to coefficient of thermal expansion. These stresses later result in changes in the dimensions of the sheeting during an etching operation, whereupon it may be difficult to align the sheeting precisely with adjacent layers of sheeting or with other circuit components. The lower the temperature at which the laminating operation is performed, the less the stresses that are incorporated into the sheeting, and accordingly dimensional control of the sheeting is greatly improved.

3. The adhesive should be adapted to use in a continuous laminating procedure. Thus, in its uncured or B-staged form, the adhesive layer on an electrically insulating base sheet should be both initially nontacky, so as to permit contact with rollers of the processing equipment, and rapidly softenable after reaching the laminating rollers, so as to immediately wet and bond to a metal foil. The initial bond must hold the foil as part of the sheeting during subsequent handling of the sheeting on the processing equipment and elevated-temperature curing of the adhesive. But the adhesive must not soften so extensively as to flow out the edges of the sheeting or into prepunched apertures under the laminating pressure.

4. The adhesive should be curable — that is, should crosslink to an essentially insoluble and infusible state — so as to develop a high-strength high-temperature-resistant bond.

5. After curing, the adhesive must be firm at the elevated temperatures, such as 450°–500° F, experienced during soldering operations. Fixtures or components may be pressed against the sheeting while it is at that temperature, or the sheeting may be agitated if the operation is performed on a molten bath of solder. If the adhesive is not firm at the elevated temperatures, the sections of circuitry etched in the layer of metal may be moved out of their proper place during the soldering operation.

6. The adhesive should be flexible, both after curing so as to facilitate handling and rolling of the completed sheeting, and often in the uncured or B-staged form, as when the adhesive is coated onto an electrically insulating base sheet, which is then precut or prepunched to facilitate later operations.

7. After curing, the adhesive should preferably be removable by chemical etching so that apertures may be etched through at least the electrically insulating base sheeting and the layer of adhesive. On the other hand, the cured adhesive should be stable in the presence of chemical agents used during processing of flexible circuitry — such as solutions for etching metal, solutions for stripping photoresists, and plating solutions.

Insofar as known, no one has previously provided an adhesive material, or a layered sheeting incorporating a film of adhesive, that exhibits to the desired extent all of the properties listed above. For that reason various compromises in the processes used to prepare multilayered sheeting for flexible circuitry, or in the properties of such sheeting, have been necessary.

SUMMARY OF THE INVENTION

The present invention provides an adhesive composition useful in film form to unite together an electrically insulating base sheet and a layer of electrically conductive metal. Briefly, a film of adhesive of the invention comprises, in compatible mixture, A. 100 parts by weight of low-molecular-weight substantially completely reacted adduct of
   1. a carboxyl-terminated polymer having the formula:

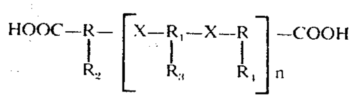

in which X is an ester group, R and $R_1$ are selected from hydrocarbon groups, hydrocarbon groups having ether linkages, and combinations of them; $R_2$ is selected from hydrocarbon groups, carboxyl, hydrogen, and halogen, and combinations of them; $R_3$ is selected from hydrocarbon groups, hydrogen, halogen, and X—R—COOH groups (where X and R have the above assigned designations) and combinations of them; and $R_4$ is selected from hydrocarbon groups, hydrogen, and halogen, and combinations of them; and *n* is at least one; and
   2. an epoxy compound containing on the average at least about 1.3 oxirane groups per molecule, said epoxy compound being present in an amount of at least two epoxide equivalent weights for each carboxyl equivalent weight of carboxyl-terminated polymer present;

B. between about 25 and 200 parts by weight of a high-molecular-weight polyhydroxy ether formed from bisphenol A and epichlorohydrin; and C. sufficient epoxy-reactive curing agent to crosslink the adhesive to an essentially insoluble and infusible state.

While polyhydroxy ethers formed from bisphenol A and epichlorohydrin have been proposed as adhesives for laminating various kinds of sheeting together, such a polyhydroxy ether would not be useful by itself to provide the combination of properties listed above. For example, it would have poor adhesion to polyimide substrates and would have inadequate hightemperature properties. is 77

Further, while others have investigated combinations of epoxy-terminated compounds and polyhydroxy ethers for use as adhesive compositions (see U.S. Pat. No. 3,177,090) and while the epoxy-terminated polymer incorporated in an adhesive of the invention is described in U.S. Pat. No. 3,576,903, no one, insofar as known, has previously recognized that a combination of such an epoxy-terminated polymer with a polyhydroxy ether would have the peculiar combination of properties needed to prepare multilayered sheeting for use as flexible electrical circuitry. The recited combination of properties is a difficult one to achieve, and the discovery that the described combination of epoxy-terminated polymer and polyhydroxy ether will provide such a combination of properties makes a useful contribution to the flexible circuitry art.

DETAILED DESCRIPTION

U.S. Pat. No. 3,576,903, which is incorporated herein by reference, discloses methods and ingredients for preparation of epoxy-terminated polymers that are useful in adhesive compositions of the invention. The useful polymers generally have ester linkages and satisfy the formula set forth above. As indicated in U.S. Pat. No. 3,576,903, the polymers are prepared by reacting a carboxyl-terminated polyester with an epoxy compound so as to terminate the polymer with epoxy or oxirane groups.

Usually the carboxyl-terminated polymers are formed by the reaction of polybasic acids with polyols, using the acid in excess. The resultant carboxyl-terminated polymers may be aliphatic, aromatic, cycloaliphatic, or of mixed structure, and they may be branched. Preferably the hydrocarbon groups in the polymers are saturated and unsubstituted, but they may have ethylenic unsaturation and they may have ether linkages.

The carboxyl-terminated polymers are generally low in molecular weight (that is, less than about 10,000 in molecular weight), and preferably are less than 5,000 in molecular weight. To achieve flexible products the molecular weight of the carboxyl-terminated polymer should generally exceed 250 and preferably 500. And the less aromaticity, generally the more flexible the polymer will be.

As noted above, the epoxy compound reacted with the carboxyl-terminated polymer should average at least about 1.3 oxirane groups per molecule to achieve epoxy termination; and at least two epoxide equivalent weights of epoxy compound should be included in a reaction mixture with one carboxyl equivalent weight of carboxyl-terminated compounds to achieve epoxy-termination. Particularly useful epoxy compounds are the liquid or solid diglycidyl ethers or polyhydric phenols such as resorcinol or bisphenol A. Other useful epoxy resins include aliphatic diepoxides such as the diglycidyl ether of diethylene glycol and the diglycidyl ether of 1,4-butanediol. Also useful are cycloaliphatic diepoxides.

The polyhydroxy ether included in adhesive compositions of the invention improves thermal properties (for example, improves strength properties at high temperatures as well as at room temperature after exposure to high temperatures), provides firmness and reduction of tackiness to the film of adhesive, and adds flexibility and toughness to a cured bond of the adhesive.

The polyhydroxy ether is regarded as thermoplastic, though it has a low degree of functionality because of the presence of hydroxyl groups that are generally reactive with the curing agent in the composition. The polyhydroxy ether is generally formed by reacting bisphenol A and epichlorohydrin to a high molecular weight (above 10,000, for example). As previously noted, useful adhesives of the inventions can be prepared by including between about 25 and 200 parts of the polyhydroxy ether per 100 parts of epoxy-terminated polymer. Preferably less than about 150 parts, and even more preferably less than about 100 parts, of polyhydroxyether are used per 100 parts of the epoxy-terminated polymer.

A variety of curing agents are known in the art for use in curing epoxy-reactive compounds. To achieve the best results with an adhesive composition of the invention, a curing agent that is also reactive with hydroxyl groups is used. A preferred class of curing agents for use in adhesives of the invention that are to be used in preparing flexible electric circuitry are the at least trifunctional aromatic acid anhydrides. Trimellitic anhydride is a preferred member of this class, and other useful members of the class are pyromellitic dianhydride and benzophenone tetracarboxylic dianhydride. Generally an approximately stoichiometric amount of curing agent based on the number of epoxy groups in a composition of the invention are used (for example, the curing agent may be used in an amount to provide between 0.8 and 1.5 reactive groups of the curing agent per oxirane group of the epoxy-terminated polymer; preferably sufficient curing agent is used to provide more than one reactive group of the curing agent per oxirane group of the epoxy-terminated polymer).

Minor additives such as fillers, pigments, and catalysts may also be included in the adhesive material. Usually the ingredients are mixed in solution and then coated onto the electrically insulating base sheet. In the case of polyimide electrically insulating base sheets, it is important that the adhesive composition be coated directly onto the base sheet, since the best adhesion to the base sheet is developed in that way. However, the adhesive material can also be coated onto a release liner to form an adhesive or bonding film for later use, or the adhesive composition can be coated directly onto an electrically conductive metal foil. The adhesive composition is then dried and often B-staged to improve its handling characteristics and to cause the adhesive to exhibit a controlled flow upon softening.

As previously noted, the adhesive film is generally dry and sufficiently nontacky in the B-staged condition for handling at room temperature. The cured adhesive layer should be firm at elevated temperatures, such as temperatures of about 450°–500° F at which soldering operations are performed. To test the adhesive at elevated temperature, a wooden tongue depressor may be rubbed firmly against a layer of the cured adhesive that is coated on an electrically insulating base sheet while the base sheet is supported on a hot plate. If the surface of the layer of adhesive can be readily disturbed, the adhesive generally does not have the desired firmness at elevated temperatures for use in preferred flexible electrical circuitry.

The electrically insulating base sheet in a sheeting of the invention may be made from a number of polymeric materials, but polyimide base sheets are especially useful because of their excellent combination of electrically insulating properties, heat-resistance, chemical inertness, and physical strength properties. Polyimides are generally characterized by the following formula (see U.S. Pat. No. 3,179,614):

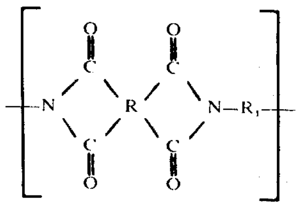

in which R is a tetravalent radical containing at least 6 carbon atoms in a ring that is characterized by benzenoid unsaturation, with the four carbonyl groups being attached to separate carbon atoms, and with each pair of carbonyl groups being attached to adjacent carbon atoms in a six-membered benzenenoid ring of the R radical; and in which $R_1$ is a divalent organic radical containing at least two carbon atoms. The invention is also useful with electrically insulating base sheets that comprise other polymers such as polyamide-imide polymers, such as described in U.S. Pat. No. 3,320,202; polyesters; and poly(parabanic) polymers.

A preformed copper foil is used most often as the electrically conductive metal layer in multilayered sheeting of the invention, but other electrically conductive metals such as aluminum and "Nichrome" alloys (which generally include nickel, chromium, and sometimes iron) may also be used.

The electrically insulating base sheet in multilayered sheeting of the invention is generally a flexible sheet between about 1 and 10 mils in thickness, but it may also take other dimensions. The adhesive layer is generally between 0.1 and 2 mils in thickness, and preferably 0.2 to 1 mil in thickness, though it also may have other dimensions. In multilayered sheeting of the invention intended for use as cover film (for example, for application over previously formed circuit boards as insulation or protection), which generally includes an electrically insulating base sheet and a layer of adhesive coated on the base sheet, the adhesive layer is somewhat thicker.

Multilayered sheeting of the invention may be used in manufacturing a variety of kinds of flexible electrical circuitry. Usually the sheeting is supplied in roll form, and often as a strip or tape. The sheeting may be marketed in a processed condition — having been etched, punched, slit, plated, soldered, etc., adapting it for use as flexible circuitry. Also, the sheeting may have sprocket holes at the sides to facilitate handling it on continuous processing equipment. One especially advantageous use of the sheeting is in manufacturing microelectronic interconnect circuitry in continuous roll form.

The invention will be further illustrated with the following examples.

EXAMPLES 1 – 8

Two solutions were prepared. The first contained an epoxy-terminated polymer that had a molecular weight of about 1,300 and had been prepared in the manner taught in U.S. Pat. No. 3,576,903 by reacting a liquid diglycidyl ether of bisphenol A ("DER 332" made by Dow Chemical Co. and having an epoxide equivalent weight of about 175) with a carboxyl-terminated polymer that had been prepared by reacting azelaic acid and neopentyl glycol. This epoxy-terminated polymer was dissolved in methyl ethyl ketone to give a 60-weight-percent-solids solution.

The second solution contained a polyhydroxy ether (Union Carbide's "Phenoxy PAHJ," which is the reaction product of bisphenol A epichlorohydrin having a molecular weight of about 30,000 and a specific gravity of 1.18) dissolved in "Cellosolve" acetate as a 25-weight-percent-solid solution.

Sufficient of the first solution to provide 100 parts of the epoxy-terminated polymer was mixed with sufficient of the second solution to provide the amount of polyhydroxy ether shown in Table 1. To this mixture of solutions was added sufficient trimellitic anhydride to provide 1.25 anhydride equivalent weights of the anhydride per epoxide equivalent weight of the epoxy-terminated polymer. The mixture was stirred until homogeneous or slightly hazy and was then filtered through a five-micron cartridge filter.

The complete solution was then coated onto a polyimide film ("Kapton" obtained from duPont) in sufficient amount to provide a dry thickness of about 0.5 mil. The coating was dried first in an oven at 250° F for 5 minutes and then in an oven at 350° F for 5 minutes. The resulting coating was dry to the touch.

The coated polyimide film was then laminated to a 1.4-mil-thick (1-ounce) copper foil (electrodeposited copper foil from Yates Industries, Treatment TAI) using pressure rolls heated to 350° F, and the resulting laminate was cured in an oven heated to 350° F for 10 minutes to yield a flexible copper-clad sheeting suitable for use as flexible electrical circuitry.

Samples of the copper-clad sheeting having one-sixteenth-inch-wide strips of copper were then subjected to a peel strength test in which the strips were pulled at an angle of 90° from the sheeting in an "Instron" tensile tester at a rate of 2 inches per minute. In addition, the peel strength of samples as described was measured after the samples had been exposed to 450° F for 30 seconds. The results obtained are shown in Table I. Samples of the sheeting were also subjected to a solder float test at 500° F (after a sample of the sheeting has been conditioned at 20 percent relative humidity at room temperature, it is laid on a bath of molten solder for 10 seconds; if any blistering appears in the base sheet or metal foil the sample has failed the test); all of the samples passed this test.

Table I

| Example No. | Parts of Polyhydroxy Ether | Peel Strength (pounds per inch width) | |
|---|---|---|---|
| | | Before High-Temp. Exposure | After High-Temp. Exposure |
| 1 | 33.4 | 5.8 | 8.2 |
| 2 | 41.75 | 5.4 | 8.0 |
| 3 | 50.1 | 8.8 | 8.0 |
| 4 | 66.8 | 7.3 | 8.8 |
| 5 | 83.5 | 9.6 | 10.2 |
| 6 | 100.2 | 10.4 | 7.5 |
| 7 | 150.3 | 8 6 | 10.4 |
| 8 | 200.4 | 3.2 | — |

EXAMPLES 9 AND 10

The procedure of Examples 1–8 was repeated except that in Example 9 the epoxy-terminated polymer used was 523-epoxide-equivalent-weight reaction product of a carboxyl-terminated polymer prepared by reacting adipic acid with 1,4-butanediol and the same diglycidyl ether of bisphenol A used in Examples 1–8; and in Example 10 the epoxy-terminated polymer used was 1,225-epoxide-equivalent-weight reaction product of a carboxyl-terminated polymer having a molecular weight of about 1,900 prepared by reacting phthalic acid with caprolactone and a cycloaliphatic epoxide (Celanese ED 5662 having an epoxide equivalent weight of 155). In both Examples 9 and 10 sufficient of the solution of polyhydroxy ether was used to provide 67 parts by weight of the polyhydroxy ether per 100 parts of the epoxy-terminated polymer.

In each of the examples, a multilayered sheeting of polyimide film, adhesive, and copper foil that was useful as flexible circuitry was prepared. When tested in the manner described in Examples 1–8, the sheeting of both examples passed the solder float test at 500°F and had a peel strength of 12–15 pounds per inch width.

What is claimed is:

1. A dry handleable flexible film of adhesive that is reactive to a flexible cured state comprising, in compatible mixture, A. 100 parts by weight of a low-molecular-weight substantially completely reacted adduct of
   1. a carboxyl-terminated polymer having the formula:

$$HOOC-\underset{R_2}{\underset{|}{R}}-\left[X-\underset{R_3}{\underset{|}{R_1}}-X-\underset{R_4}{\underset{|}{R}}\right]_n-COOH$$

in which X is an ester group, R and $R_1$ are selected from hydrocarbon groups, hydrocarbon groups having ether linkages, and combinations of them; $R_2$ is selected from hydrocarbon groups, carboxyl, hydrogen, and halogen, and combinations of them; $R_3$ is selected from hydrocarbon groups, hydrogen, halogen, and X—R—COOH groups (where X and R have the above-assigned designations), and combinations of them; and $R_4$ is selected from hydrocarbon groups, hydrogen, and halogen, and combinations of them; and *n* is at least one; and
   2. an epoxy compound containing on the average at least about 1.3 oxirane groups per molecule, said epoxy compound being present in the amount of at least two epoxide equivalent weights for each carboxyl equivalent weight of carboxyl-terminated polymer present;

B. between about 25 and 200 parts by weight of a high-molecular-weight polyhydroxy ether formed from bisphenol A and epichlorohydrin; and C. sufficient of an epoxy-reactive curing agent to crosslink the mixture to an essentially insoluble and infusible state.

2. A multilayered sheeting useful as a component of electric circuitry comprising an electrically insulating polymeric base sheet carrying on at least one side film of the adhesive of claim 1.

3. Multilayered sheeting of claim 2 in which the base sheet comprises a polyimide.

4. Multilayered sheeting useful as a component of electric circuitry comprising an electrically insulating polymeric base sheet, at least one electrically conductive layer of metal, and a film of cured adhesive according to claim 1 uniting the base sheet and electrically conductive layer of metal together.

5. Multilayered sheeting of claim 4 which includes an electrically conductive layer of metal on each side of the base sheet, and thin films of adhesive according to claim 1 uniting the base sheet and said electrically conductive layers together.

6. Multilayered sheeting of claim 4 having adhesive-free apertures extending at least through the base sheet and film of adhesive.

7. Flexible electric circuitry comprising multilayered sheeting of claim 4 in which said electrically conductive layer of metal is patterned to provide electric circuitry.

8. An article of electric circuitry comprising flexible circuitry of claim 7 and other electrical components electrically connected to said electrically conductive layer of metal.

9. Multilayered sheeting useful as a component of electric circuitry comprising an electrically insulating polymeric base sheet that comprises a polyimide, at least one electrically conductive layer of metal, and a film of cured adhesive according to claim 1 uniting the base sheet and electrically conductive layer of metal together.

10. Multilayered sheeting that is windable in a roll and is useful as a component of electric circuitry comprising an electrically insulating polymeric base sheet that comprises a polyimide, and coated on at least one side of said base sheet, a dry nontacky flexible film of adhesive that is reactive to a flexible cured state comrpsing, in compatible mixture, comprising, A. 100 parts by weight of a low-molecular-weight substantially completely reacted adduct of
   1. a carboxyl-terminated polymer having the formula:

$$HOOC-\underset{R_2}{\underset{|}{R}}-\left[X-\underset{R_3}{\underset{|}{R_1}}-X-\underset{R_1}{\underset{|}{R}}\right]_n-COOH$$

in which X is an ester group, R and $R_1$ are selected from hydrocarbon groups, hydrocarbon groups having ether linkages, and combinations of them; $R_2$ is selected from hydrocarbon groups, carboxyl, hydrogen, and halogen, and combinations of them; $R_3$ is selected from hydrocarbon groups, hydrogen, halogen, and X—R—COOH groups (where X and R have the above-assigned designations), and combinations of them; and $R_4$ is selected from hydrocarbon groups, hydrogen, and halogen, and combinations of them; and *n* is at least one; and
   2. an epoxy compound containing on the average at least about 1.3 oxirane groups per molecule, said epoxy compound being present in the amount of at least two epoxide equivalent weights for each carboxyl equivalent weight of carboxyl-terminated polymer present;

B. between about 25 and 150 parts by weight of a high-molecular-weight polyhydroxy ether formed from bisphenol A and epichlorohydrin; and C. sufficient of an at least trifunctional aromatic anhydride curing agent to crosslink the mixture to an essentially insoluble and infusible state.

11. Multilayered sheeting of claim 10 that further comprises at least one electrically conductive layer of metal united to the sheeting by said film of adhesive.

12. Flexible electric circuitry comprising a multilayered sheeting of claim 11 in which said electrically conductive layer of metal is patterned to provide electric circuitry.

13. An article of electric circuitry comprising flexible circuitry of claim 12 and other electrical components electrically connected to said electrically conductive layer of metal.

14. Multilayered sheeting of claim 11 having adhesive-free apertures extending at least through the base sheet and film of adhesive.

15. Microelectronic interconnect circuitry in continuous roll form comprising multilayered sheeting of claim 11.

* * * * *